(12) United States Patent
Kuo et al.

(10) Patent No.: US 8,331,359 B2
(45) Date of Patent: *Dec. 11, 2012

(54) FLEXIBLE COUNTER UPDATE AND RETRIEVAL

(75) Inventors: Albert Weichung Kuo, Los Gatos, CA (US); Reuven Meyer Samuel, San Jose, CA (US); Debashis Basu, San Jose, CA (US); Arunachalam Vaidyanathan, Los Altos, CA (US); Spencer Greene, Palo Alto, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 347 days.

This patent is subject to a terminal disclaimer.

(21) Appl. No.: 12/723,280

(22) Filed: Mar. 12, 2010

(65) Prior Publication Data

US 2010/0169608 A1    Jul. 1, 2010

Related U.S. Application Data

(63) Continuation of application No. 11/943,225, filed on Nov. 20, 2007, now Pat. No. 7,710,952, which is a continuation of application No. 10/310,778, filed on Dec. 6, 2002, now Pat. No. 7,317,718.

(51) Int. Cl.
*H04Q 11/00* (2006.01)

(52) U.S. Cl. .......................... 370/360; 709/214; 709/215

(58) Field of Classification Search .................. 370/360, 370/353; 709/214, 215
See application file for complete search history.

(56) References Cited

U.S. PATENT DOCUMENTS

| | | | |
|---|---|---|---|
| 6,038,592 A | 3/2000 | Verplanken et al. | |
| 6,192,326 B1 | 2/2001 | Lehtinen | |
| 6,202,130 B1 | 3/2001 | Scales et al. | |
| 6,226,295 B1 * | 5/2001 | Morzano | 370/395.31 |
| 6,330,599 B1 | 12/2001 | Harvey | |
| 6,460,010 B1 | 10/2002 | Hanes et al. | |
| 6,625,266 B1 | 9/2003 | Saari et al. | |
| 6,642,762 B2 | 11/2003 | Von Kaenel | |
| 7,317,718 B1 * | 1/2008 | Kuo et al. | 370/360 |
| 7,318,123 B2 | 1/2008 | Mekhiel | |
| 7,710,952 B1 * | 5/2010 | Kuo et al. | 370/360 |
| 2003/0131218 A1 | 7/2003 | Mayfield et al. | |
| 2003/0200412 A1 | 10/2003 | Peinado et al. | |
| 2003/0204673 A1 | 10/2003 | Venkumahanti et al. | |
| 2004/0228462 A1 | 11/2004 | Kivela et al. | |
| 2007/0226397 A1 * | 9/2007 | Gouder De Beauregard et al. | 711/100 |

\* cited by examiner

*Primary Examiner* — Albert T Chou
(74) *Attorney, Agent, or Firm* — Harrity & Harrity, LLP

(57) ABSTRACT

A network device includes one or more processing units and an external memory. Each of the one or more processing units includes a centralized counter configured to perform accounting for the respective processing unit. The external memory is associated with at least one of the one or more processing units and is configured to store a group of count values for the at least one processing unit.

20 Claims, 9 Drawing Sheets

FLEXIBLE COUNTER UPDATE AND RETRIEVAL

RELATED APPLICATIONS

This application is a continuation of U.S. patent application Ser. No. 11/943,225 filed on Nov. 20, 2007, which is a continuation of U.S. patent application Ser. No. 10/310,778 filed Dec. 6, 2002 (now U.S. Pat. No. 7,317,718), which are incorporated herein by reference.

BACKGROUND OF THE INVENTION

1. Field of the Invention

The present invention relates generally to network devices, and more particularly, to systems and methods for performing accounting in a network device.

2. Description of Related Art

In a typical network device where enqueue, dequeue, packet drop, byte and event statistics are desired, different counters and counter logic are used throughout the device at different stages of a data pipeline. High programmable input/output (PIO) bandwidth is generally needed when it is desired to retrieve statistics at a fairly short periodic interval. The interval is commonly determined by the number and size of the counters.

Each counter logic block in the network device may have different count memory schemes and count-update logic. Also, each count retrieval typically takes at least one PIO-read request. To change characteristics on counts belonging to separate blocks, consistency and coordination between system designers is needed.

As the number of network sources and streams grow, it becomes expensive and at times difficult to handle counts in the distributed manner described above. Flexibility is limited when predetermined counter location, size, as well as roll-over/saturating characteristics are set for a counter. Moreover, reading blocks of counts can be very time-consuming in the above-described architecture since at least one PIO-read request is needed for each count.

Accordingly, it is desirable to improve the ability to perform accounting in a network device.

SUMMARY OF THE INVENTION

Systems and methods consistent with the principles of the invention address this and other needs by providing a centralized counter logic block, which can be easily tailored to meet the needs of the system.

One aspect consistent with principles of the invention is directed to a network device that includes one or more processing units and an external memory. Each of the one or more processing units includes a centralized counter configured to perform accounting for the respective processing unit. The external memory is associated with at least one of the one or more processing units and is configured to store a group of count values for the at least one processing unit.

A second aspect consistent with principles of the invention is directed to a method for performing accounting in a network device that includes a group of processing blocks. The method includes processing a data unit via one of the processing blocks; generating a request to update a count value based on the processing; transferring the request to centralized counter logic, where the centralized counter logic is configured to perform accounting for at least two of the processing blocks; retrieving, via the centralized counter logic, the count value from a memory, where the memory stores count values for the at least two processing blocks; incrementing, via the centralized counter logic, the count value; and storing the incremented count value in the memory.

A third aspect consistent with principles of the invention is directed to a method for retrieving counter values in a network device. The method includes receiving a request for a block of counter values from a remote device at a centralized counter in the network device, retrieving the block of counter values from a memory, placing the block of counter values in at least one packet, and transmitting the at least one packet to the remote device.

A fourth aspect consistent with principles of the invention is directed to a network device that includes a group of processing blocks, a memory, and a centralized counter. The memory is configured to store counter values for at least two of the processing blocks. The centralized counter is configured to update the counter values in the memory, retrieve single counter values from the memory, and retrieve blocks of counter values from the memory.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention. Instead, the scope of the invention is defined by the appended claims and equivalents.

Implementations consistent with the principles of the invention efficiently perform accounting in a network device by providing a centralized counter logic block that performs all accounting functions and provides the ability to retrieve single counts through one PIO-read request or blocks of counts through a packetization technique thereby saving valuable bandwidth that would otherwise be spent on multiple PIO-read requests.

System Configuration

Figure 1:
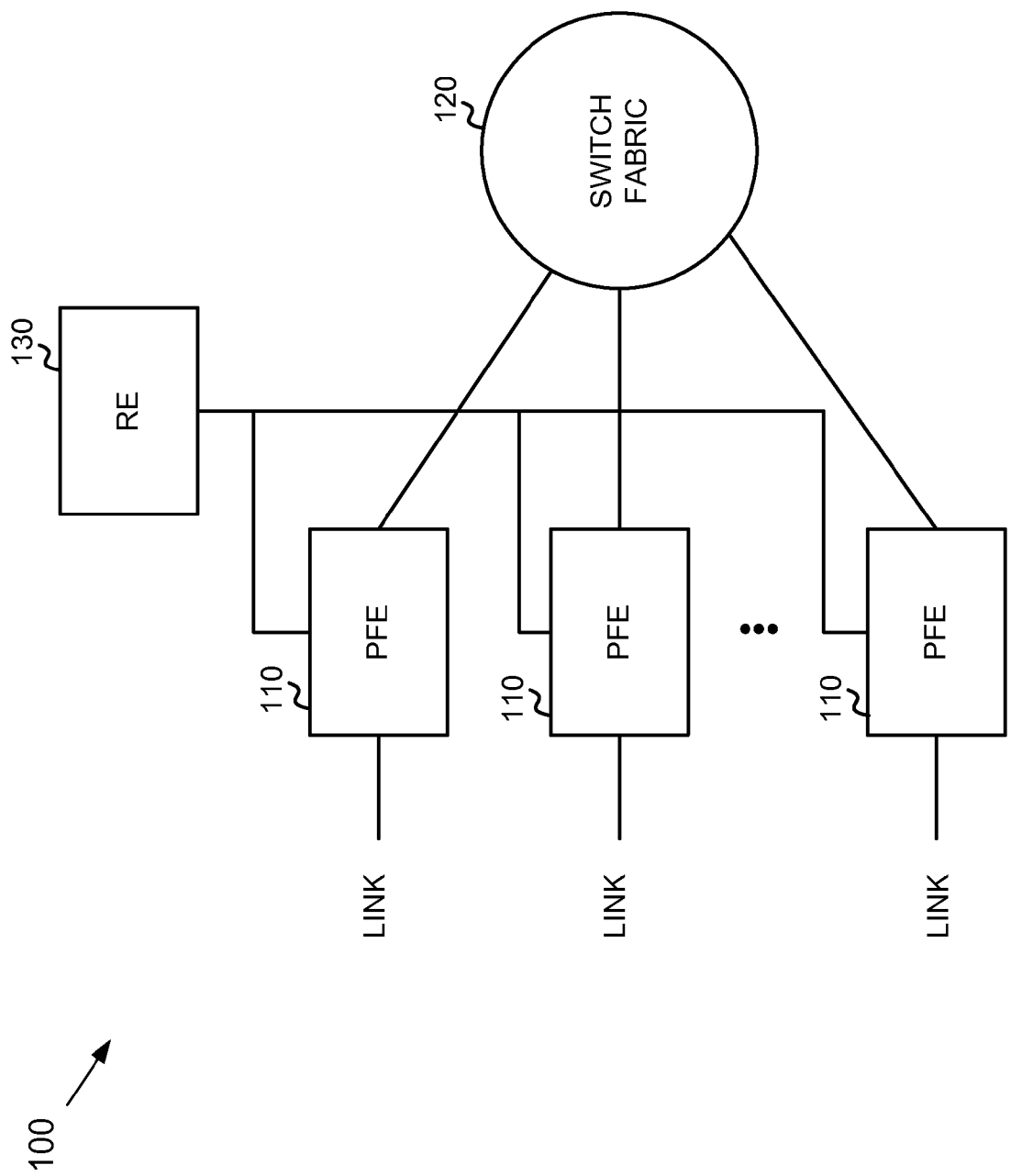
FIG. 1 is a block diagram illustrating an exemplary routing system in which systems and methods consistent with the principles of the invention may be implemented.

FIG. 1 is a block diagram illustrating an exemplary routing system 100 in which systems and methods consistent with the principles of the invention may be implemented. System 100 receives one or more packet streams from physical links, processes the packet stream(s) to determine destination information, and transmits the packet stream(s) out on links in accordance with the destination information. System 100 may include packet forwarding engines (PFEs) 110, a switch fabric 120, and a routing engine (RE) 130.

RE 130 performs high level management functions for system 100. For example, RE 130 communicates with other networks and systems connected to system 100 to exchange information regarding network topology. RE 130 may create routing tables based on network topology information, create forwarding tables based on the routing tables, and forward the forwarding tables to PFEs 110. PFEs 110 use the forwarding tables to perform route lookup for incoming packets. RE 130 may also perform other general control and monitoring functions for system 100.

PFEs 110 are each connected to RE 130 and switch fabric 120. PFEs 110 receive packet data on physical links connected to a network, such as a wide area network (WAN), a local area network (LAN), or another type of network. Each physical link could be one of many types of transport media, such as optical fiber or Ethernet cable. The data on the physical link is formatted according to one of several protocols, such as the synchronous optical network (SONET) standard, an asynchronous transfer mode (ATM) technology, or Ethernet.

A PFE 110 may process incoming packet data prior to transmitting the data to another PFE or the network. PFE 110 may also perform a route lookup for the data using the forwarding table from RE 130 to determine destination information. If the destination indicates that the data should be sent out on a physical link connected to PFE 110, then PFE 110 prepares the data for transmission by, for example, adding any necessary headers, and transmits the data from the port associated with the physical link. If the destination indicates that the data should be sent to another PFE via switch fabric 120, then PFE 110 prepares the data for transmission to the other PFE, if necessary, and sends the data to the other PFE via switch fabric 120.

Figure 2:
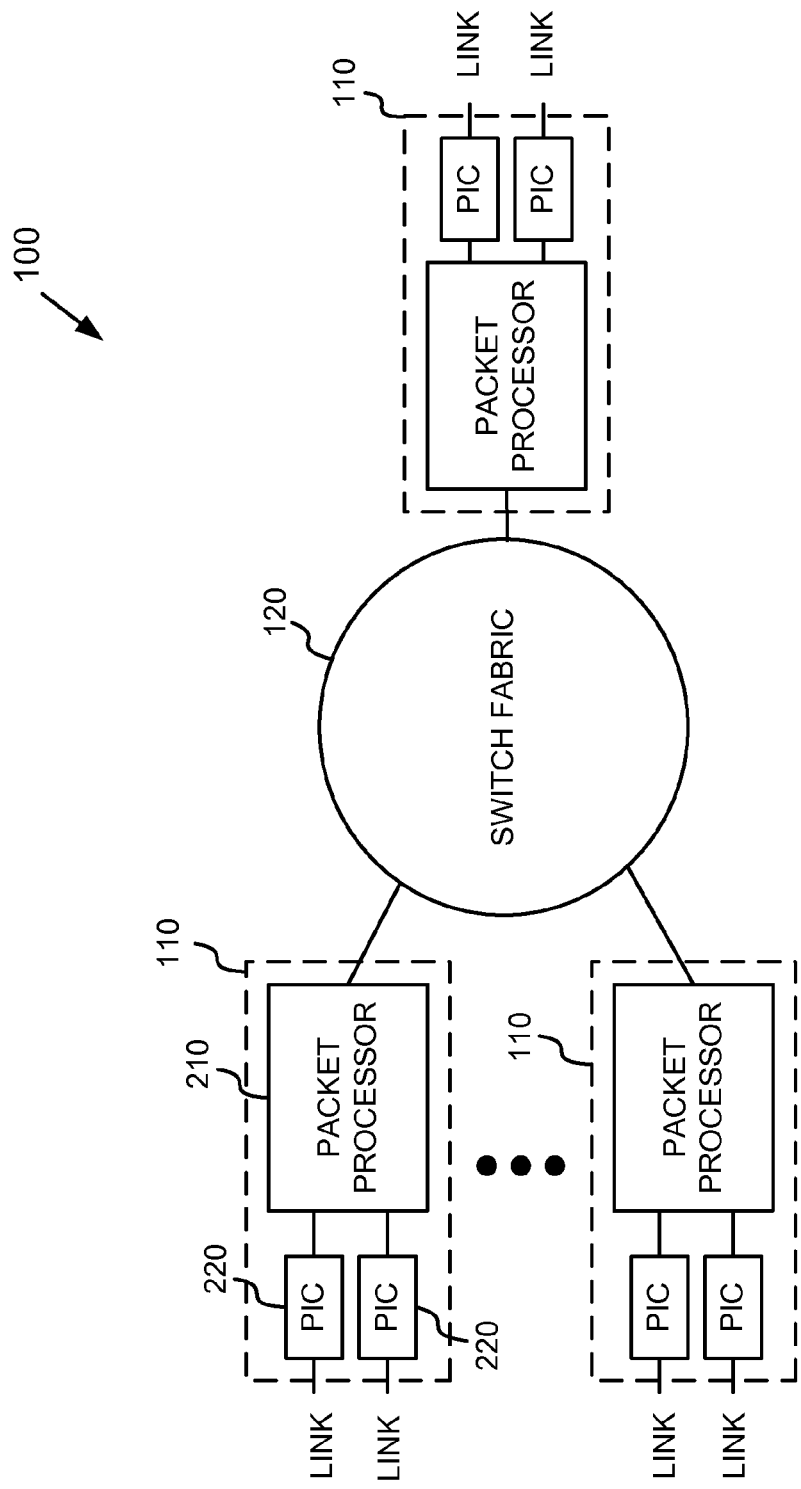
FIG. 2 is an exemplary detailed block diagram illustrating portions of the routing system of FIG. 1.

FIG. 2 is a detailed block diagram illustrating portions of routing system 100. PFEs 110 connect to one another through switch fabric 120. Each of PFEs 110 may include one or more packet processors 210 and physical interface cards (PICs) 220. Although FIG. 2 shows two PICs 220 connected to each of packet processors 210 and three packet processors 210 connected to switch fabric 120, in other embodiments consistent with principles of the invention there can be more or fewer PICs 220 and packet processors 210.

Each of packet processors 210 performs routing functions and handles packet transfers to and from PICs 220 and switch fabric 120. For each packet it handles, packet processor 210 performs the previously-discussed route lookup function and may perform other processing-related functions.

PIC 220 may transmit data between a physical link and packet processor 210. Different PICs may be designed to handle different types of physical links. For example, one of PICs 220 may be an interface for an optical link while another PIC 220 may be an interface for an Ethernet link.

In routing system 100 described above, it may be desirable to perform accounting at various stages of the system. The flexible counter update and retrieval technique described below can be implemented in any part (e.g., packet processor 210, PIC 220, etc.) of routing system 100 in which accounting services are desired. For explanatory purposes, it will be assumed that the flexible counter update and retrieval technique is implemented in a PIC 220.

Figure 3:
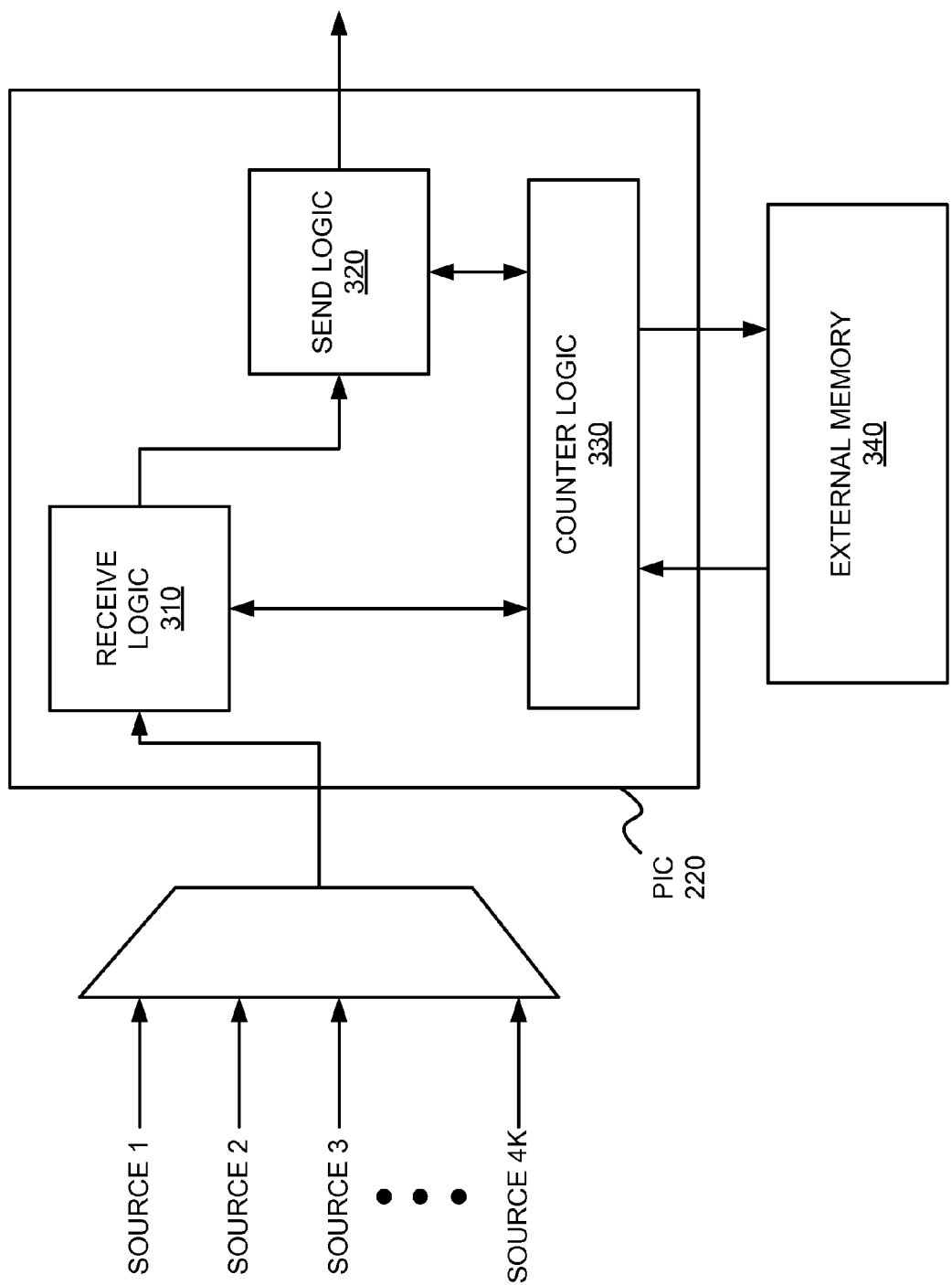
FIG. 3 illustrates an exemplary physical interface card (PIC) configuration according to an implementation consistent with the principles of the invention.

FIG. 3 illustrates an exemplary PIC 220 configuration according to an implementation consistent with the principles of the invention. As illustrated, PIC 220 includes receive logic 310, send logic 320, and counter logic 330 that, as will be described in detail below, updates and retrieves count values (referred to hereinafter as "counts") from an external memory 340. It will be appreciated that PIC 220 may include additional devices (not shown) that aid in receiving, processing, or transmitting data. Moreover, the number of components and sources illustrated in FIG. 3 is exemplary.

Receive logic 310 may receive a packet (or other data unit) from one of a group of sources (for illustrative purposes, labeled 1 to 4,000) and determine, based on the packet, what type of event is occurring. In an exemplary implementation, each source may be associated with 32 different events. Exemplary event information may include whether the packet is enqueued, dequeued, dropped, includes an error, etc. Other event information may include packet size (e.g., in bytes). This way, PIC 220 may track, for example, how many bytes have been enqueued, dequeued, dropped, etc. from a particular source. Upon receipt of a packet, receive logic 310 may transmit event information to counter logic 330 to allow for the appropriate count(s) to be updated in external memory 340.

Send logic 320 may receive a packet for sending out of PIC 220 and notify counter logic 330 accordingly. Counter logic 330 may then update the appropriate count(s) in external memory 340 based on the notification.

Counter logic 330 may receive event information from receive logic 310 and send logic 320 and update the appropriate count(s) in external memory 340 by performing a read/modify/write operation. Counter logic 330 may, for example, retrieve the appropriate count(s) from external memory 340, increment the count(s), for example, by adding one to the retrieved count(s), and write the new value(s) back to the same location(s) in external memory 340.

Counter logic 330 may also configure and allocate count space in external memory 340. Counter logic 330 allocates one count for each event associated with a source. In one implementation consistent with the principles of the invention, counter logic 330 may allocate counts in 1 byte, 2 byte, 4 byte, or 8 byte widths. All count widths are for packet counts, except, as will be described further below, that an 8-byte count may include a 29-bit packet-count field and a 35-bit byte-count field.

External memory 340 stores counts for the different events associated with each source in the system. In one implementation, external memory may include a double data rate static random access memory (DDrSRAM) that includes 128,000 memory lines, where each line includes 64 bits.

Figure 4:
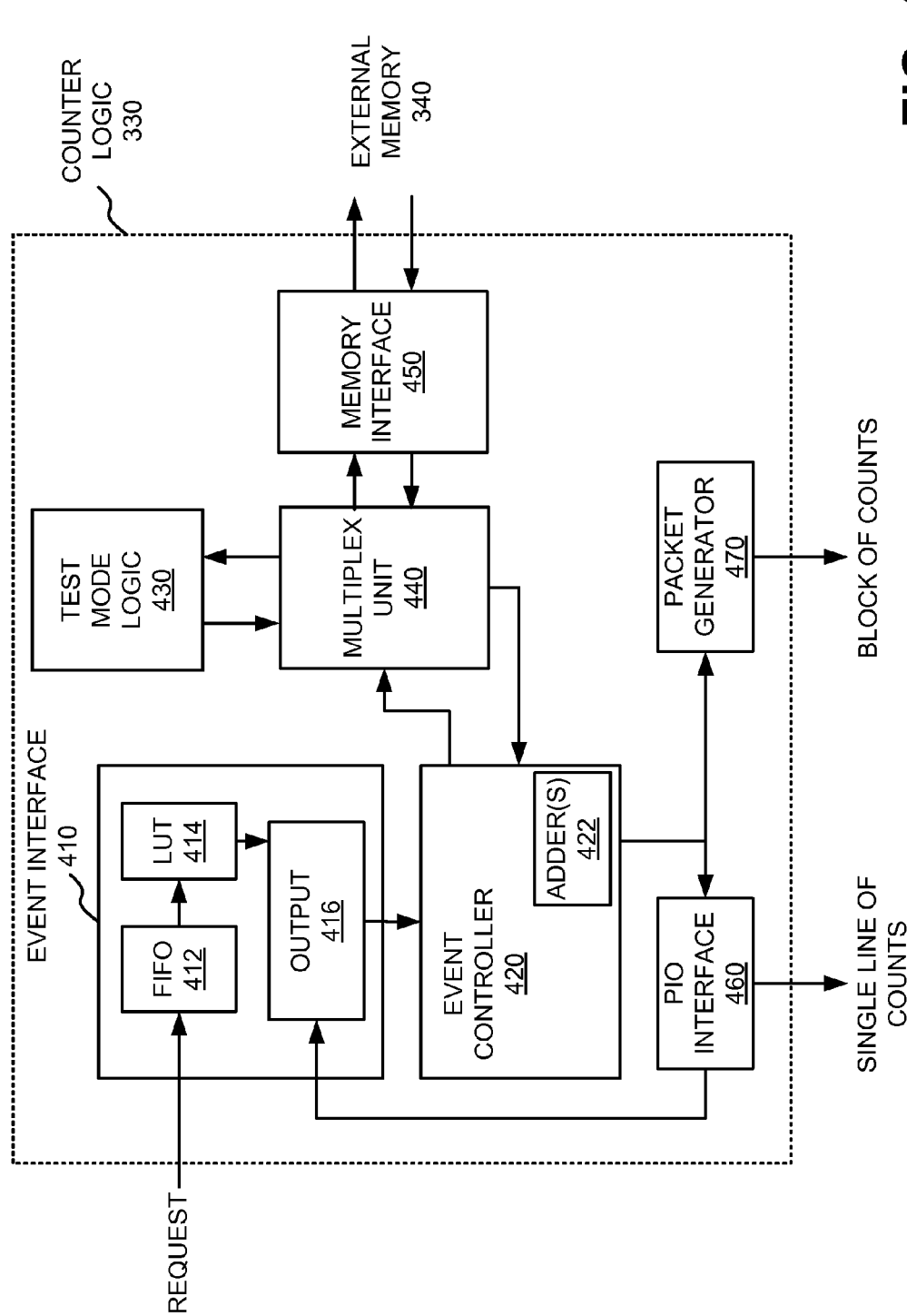
FIG. 4 illustrates an exemplary configuration of a counter block in an implementation consistent with the principles of the invention.

FIG. 4 illustrates an exemplary configuration of counter logic 330 in an implementation consistent with the principles of the invention. As illustrated, counter logic 330 may include an event interface 410, an event controller 420, test mode logic 430, a multiplex unit 440, a memory interface 450, a programmable input/output (PIO) interface 460, and a packet generator 470. It will be appreciated that counter logic 330 may include additional devices (not shown) that aid in receiving, processing, or transmitting data.

Event interface 410 may receive a count retrieval or update request and determine the location of the appropriate count in external memory 340. As will be described in additional detail below, a count retrieval request may retrieve a single 64-bit line from external memory 340 or a block of lines. An update request may include, for example, a source number that identifies the source (e.g., ranging from 0 to 4K−1), an event number that identifies the particular event (e.g., ranging from 0 to 31), and an increment amount in terms of packet length (e.g., from 0 to 65535). Counter logic 330 may use this information for updating a count in external memory 340.

Event interface 410 may include a first-in, first-out (FIFO) memory 412, a group of lookup tables (LUTs) 414, and an output interface 416. FIFO 412 may receive a request and temporarily store the request. FIFO 412 outputs requests in a first-in, first-out order. LUT 414 provides the location of a count in external memory 340 and the characteristics of the count.

Figure 5:
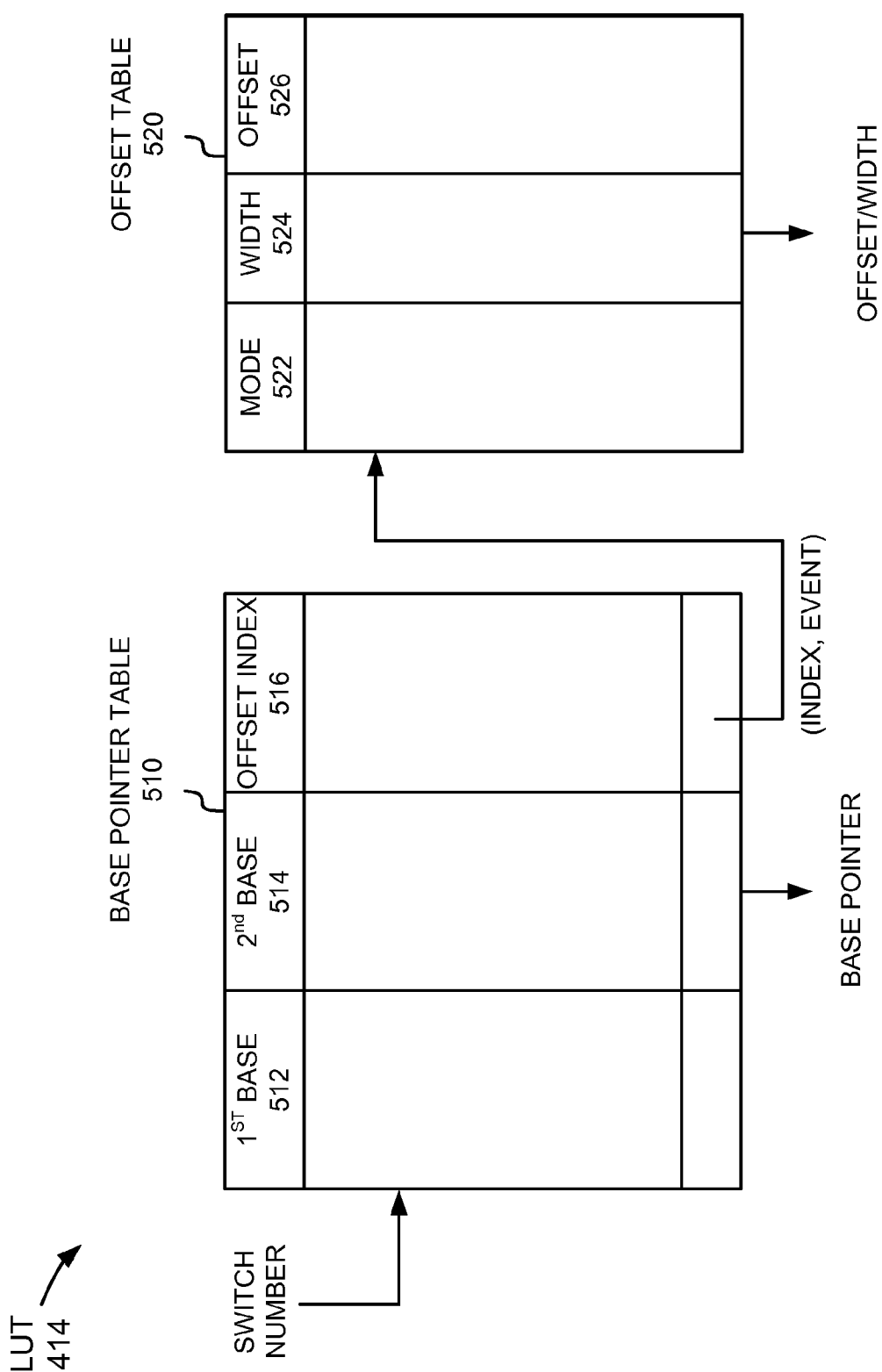
FIG. 5 illustrates an exemplary configuration of a lookup table (LUT) in an implementation consistent with the principles of the invention.

FIG. 5 illustrates an exemplary configuration of LUT 414 in an implementation consistent with the principles of the invention. As illustrated, LUT 414 may include a base pointer table 510 and an offset table 520. Base pointer table 510 may receive a request, including a source number and event number, and provide, based on the request, a base pointer that points to the start of a block of counts in external memory 340. Base pointer table 510 may include a first base pointer field 512, a second base pointer field 514, and an offset index field 516. First base pointer field 512 may include one or more base pointers that point to the start of blocks in external memory 340. In one implementation, each base pointer points to a 64-byte block of memory.

Similarly, second base pointer field 514 may include one or more base pointers that point to the start of blocks in external memory 340. As will be described in additional detail below, external memory 340 may be partitioned into a roll-over region and a saturating region. First base pointer field 512 includes one or more base pointer that point to the start of blocks in the roll-over region, while second base pointer field 514 includes one or more base pointers that point to the start of blocks in the saturating region. Offset index field 516 may include indices to entries in offset table 520.

Offset table 520 may receive an offset index and event number from base pointer table 510 and provide, based thereon, an offset value that points to a location of a count in the block identified by the base pointer provided by base pointer table 510. That is, offset table 520 provides a location of a count within the block identified by base pointer table 510.

Offset table 520 may include a mode field 522, a width field 524, and an offset field 526. Mode field 522 may include information indicating whether or not a particular count is enabled, and whether a count is in the roll-over or saturating region (i.e., if $1^{st}$ Base 512 or $2^{nd}$ Base 514 is to be used). Width field 524 may include information identifying the width of a particular count. As set forth above, a count may have a width of 1 byte, 2 bytes, 4 bytes, or 8 bytes. A width of a count may be easily changed by reprogramming the appropriate entry in width field 524 associated with the count. Offset field 526 may include offset values that identify the location of counts within a block identified by base pointer table 510. Base pointer table 510 and offset table 520 may be fully programmable.

Returning to FIG. 4, output 416 may receive a base pointer and offset and width values from LUT 414 and transfer these values to event controller 420. Event controller 420 identifies the event associated with a received request, converts a base pointer/offset/width values from base pointer table 510 and offset table 520 into an external memory 340 pointer, retrieves the appropriate count value, updates the count value (if appropriate), and stores the updated count value back into external memory 340. Event controller 420 may also transfer count read requests to PIO interface 460 and packet generator 470 for transfer to the appropriate destination.

Event controller 420 may include a set of adders 422. In one implementation, event controller 420 may include two adders 422. One adder may be dedicated to incrementing packet counts, while the other counter may be dedicated to incrementing byte counts. Packet counts may be incremented by one. Byte counts may be incremented by packet length.

Test mode logic 430, when activated, may zero out (or set to some predetermined value) all counts in external memory 340. Multiplex unit 440 transfers signals from event controller 420 or test mode logic 430 to the external memory 340. When test mode is activated, test mode logic 430 controls the reading/writing of count values from/to external memory 340. When test mode is deactivated, event controller 420 controls the reading/writing of count values from/to external memory 340.

Memory interface 450 transfers data to and receives data from external memory 340. Memory interface 450 also transfers the data received from external memory 340 to its appropriate destination (e.g., event controller 420). PIO interface 460 handles all PIO requests and allows for a single line of counts to be read from external memory 340 and overwritten, if desired. Packet generator 470 is similar to PIO interface 460 except that it allows for bigger chunks of counts (i.e., bigger than a single line) to be retrieved from external memory 340 and transferred out of PIC 220 in a packet format.

Figure 6:
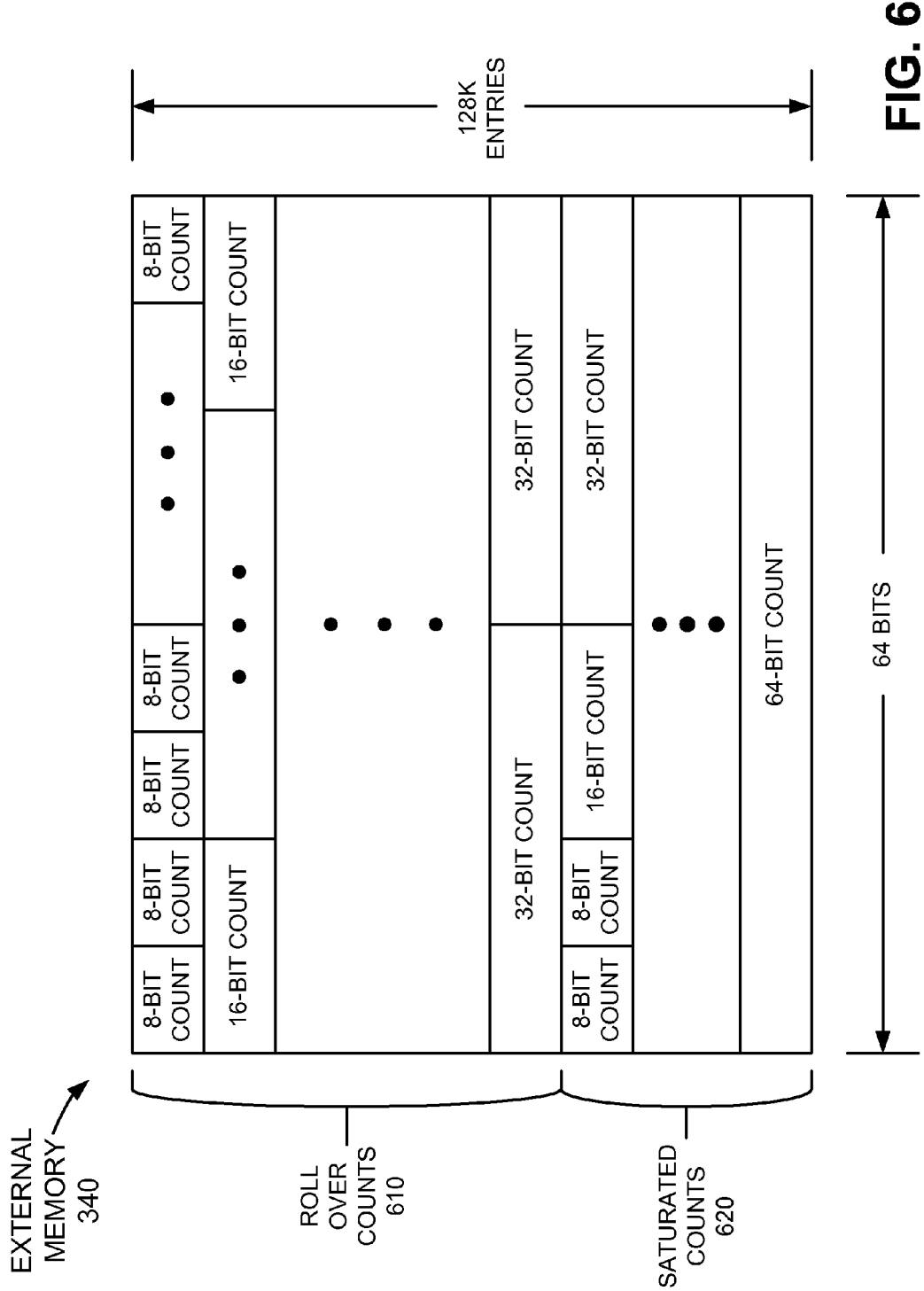
FIG. 6 illustrates an exemplary configuration of an external memory in an implementation consistent with the principles of the invention.

FIG. 6 illustrates an exemplary configuration of external memory 340 in an implementation consistent with the principles of the invention. In one implementation, external memory 340 may include 128,000 memory lines, where each line includes 64 bits.

As illustrated, external memory 340 may be partitioned into a roll-over region 610 and a saturating region 620. A count may be assigned to either roll-over region 610 or saturating region 620. The boundry between these two regions may be software programmable. In roll-over region 610, a count increments to some predetermined threshold, resets, increments to the threshold, and so on. In one implementation, the threshold is 16. In the saturating region, a count increments to some predetermined threshold and then stops, even if additional events for that count occur. Counts may be assigned to roll-over region 610 or saturating region 620 via LUT 414. As described above, counts may be assigned to 1-byte, 2-byte, 4-byte, or 8-byte widths.

Exemplary Processing

Figure 7:
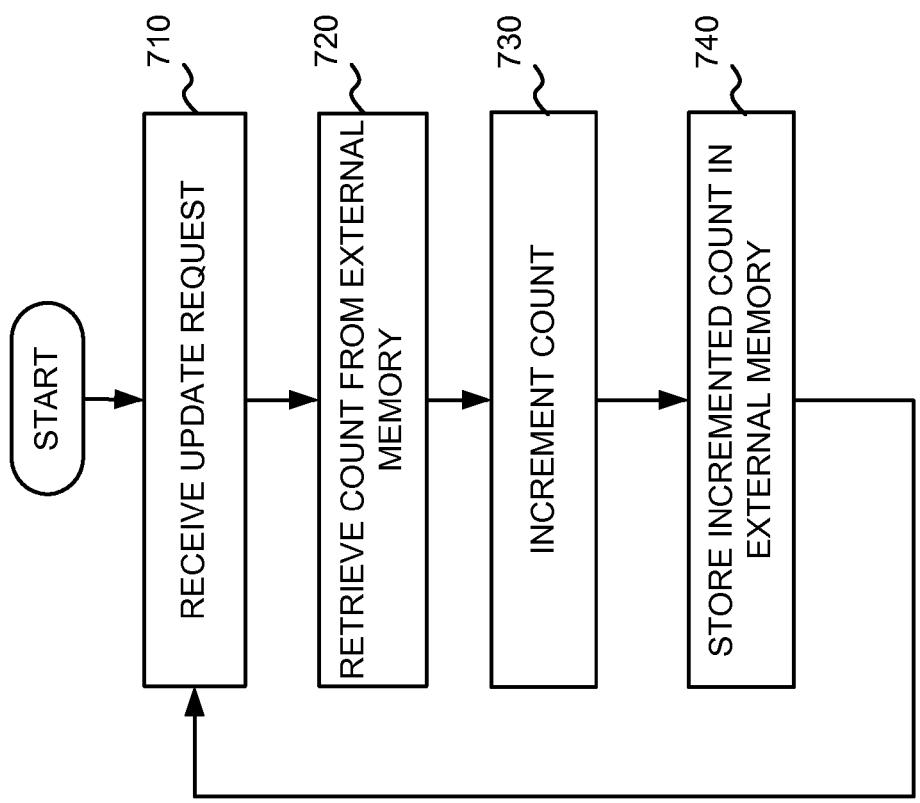
FIG. 7 illustrates an exemplary process for updating counts in an implementation consistent with the principles of the invention.

FIG. 7 illustrates an exemplary process for updating counts in an implementation consistent with the principles of the invention. Processing may begin with counter logic 330 receiving an update request [act 710]. Counter logic 330 may receive the update request from, for example, receive logic 310 or send logic 320 in response to the occurrence of an event (e.g., the dropping of a packet). The update request may include a source number that identifies the source of the packet, an event number that identifies the event, and an increment amount that identifies the amount that a count associated with the event is to be incremented. In one implementation consistent with the principles of the invention, the update request may be 33 bits, where the source number is 12 bits, the event number is 5 bits, and the increment amount is 16 bits. The increment amount may, in one implementation, represent the packet size (or length) in terms of bytes.

In response to the update request, counter logic 330 may retrieve the appropriate count from external memory 340 associated with the source number/event number identified in the request [act 720]. To retrieve the count, counter logic 330 may use base pointer table 510 and offset table 520 to obtain a base pointer and offset/width values that uniquely identify the location of the count in external memory 340. Counter logic 330 may retrieve the count based on the base pointer and offset/width values.

Counter logic 330 may then increment the count by the amount indicated by the increment amount in the update request [act 730]. In one implementation consistent with the principles of the invention, all counts in external memory 340 increment by one, except for those counts having an 8-byte width. As described above, 8-byte counts include a 29-bit packet-count field and a 35-bit byte-count field. Counter logic 330 may simultaneously update the packet-count field and byte-count field. The packet-count field may be incremented by one, while the byte-count field may be incremented by the packet size (in bytes).

Once the count has been incremented, counter logic 330 may store the incremented count in external memory 340 [act 740]. Processing may then return to act 710 with counter logic 330 processing the next update request.

When desired, the updating of counts may be enabled or disabled. As noted above, offset table 520 includes a mode field 522 that stores a value indicating whether updating for a particular count is enabled or disabled. In addition, counter logic 330 may be remotely controlled to start/stop the count update processing described above. Moreover, counter logic 330 may be remotely controlled to accept/drop update requests.

Figure 8:
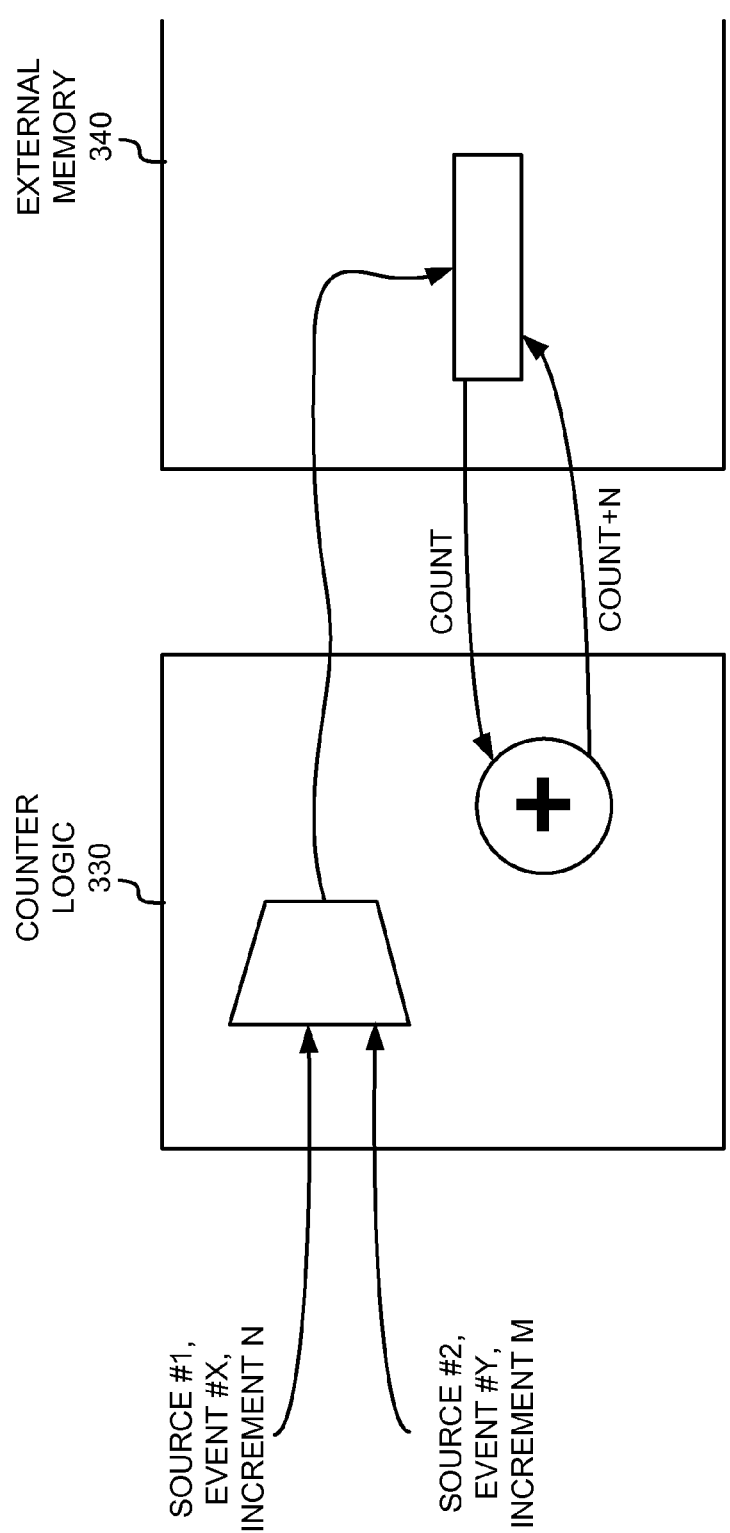
FIG. 8 illustrates a simplified block diagram of the processing described in relation to FIG. 7.

FIG. 8 illustrates a simplified block diagram of the processing described in relation to FIG. 7. As illustrated, counter logic 330 may receive update requests from, for example, receive logic 310 or send logic 320. In response, counter logic 330 may select one of the update requests to process based, for example, on which request was received first. Assume that counter logic 330 receives the update request {source #1, event #X, increment N} first. Counter logic 330 may retrieve the appropriate count from external memory 340, increment the count by the increment amount N, and store the new count (i.e., count+N) back to external memory 340. Counter logic 330 may then process the next update request.

Figure 9:
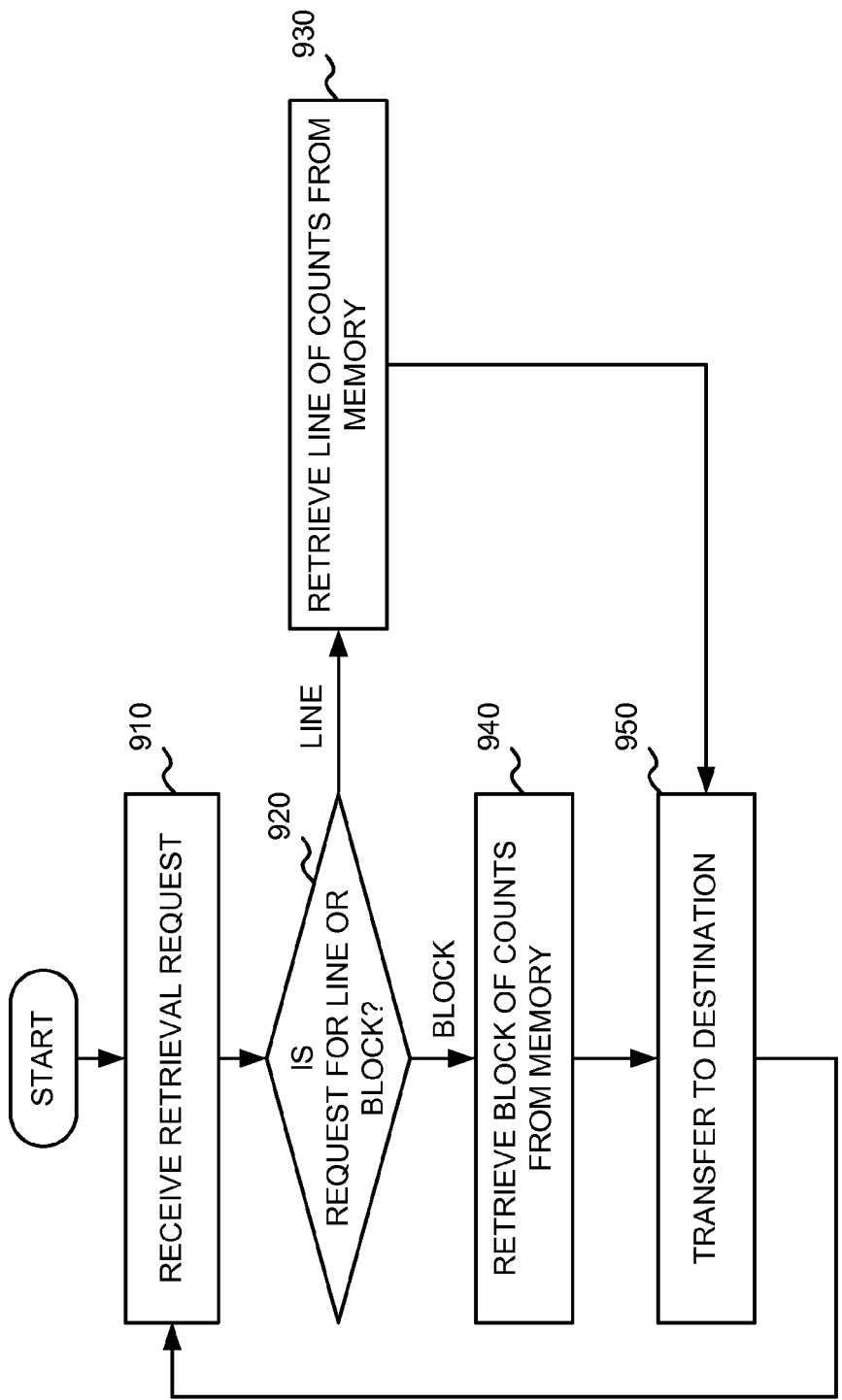
FIG. 9 illustrates an exemplary process for retrieving counts in an implementation consistent with the principles of the invention.

FIG. 9 illustrates an exemplary process for retrieving counts in an implementation consistent with the principles of the invention. Processing may begin with counter logic 330 receiving a count retrieval request [act 910]. In one implementation, the count retrieval request may include a PIO-read request for a single line (64 bits) of counts or a PIO-packetization request for a block (64 bytes) of counts from external memory 340.

If the request is for a single line of counts [act 920], counter logic 330 may retrieve the appropriate line from external memory 340 [act 930]. Once retrieved, the line in external memory 340 can be overwritten, if desired, with a user-defined value. Counter logic 330 may transfer the retrieved line from external memory to the appropriate destination via PIO interface 460 [act 950].

When high bandwidth is desired for count retrieval, a block retrieval request can be used. If counter logic 330 receives a block retrieval request [act 920], counter logic 330 may retrieve the appropriate block from external memory 340 [act 940]. Counter logic 330 may then packetize the retrieved block using packet generator 470 and transfer the packet to the appropriate destination [act 950]. In one implementation consistent with the principles of the invention, the packet may be interspersed with regular traffic and transmitted via, for example, send logic 320. Counts in saturating region 620 may be cleared (or reset) upon retrieval by counter logic 330, while counts in roll-over region 610 may remain intact upon retrieval.

In certain instances, it may be desirable to zero out (or reset) a group of counts in external memory 340. In one implementation consistent with the principles of the invention, this may be accomplished via test mode logic 430, via a single line retrieval request or a block retrieval request. When counter logic 330 enters a test mode, normal traffic to the block is temporarily stopped and test mode logic 430 assumes control of interfacing with memory interface 450. Test mode logic 430 may then walk through all the counts (or some portion of them) in external memory 340 and reset the values of the counts (e.g., set the values to zero). Alternatively, test mode logic 430 may set the counts to a user-specified value.

When a single line retrieval request is received, the requestor may be given the opportunity to overwrite the line of memory. If desired, the counts in the line in external memory 340 may be reset or set to a user-specified value. As described above, when retrieving a block of counts via a block retrieval request, any counts retrieved from saturating region 620 of external memory 340 may be automatically reset.

Implementations consistent with the principles of the invention improve the performance of accounting in a network device. Unlike conventional approaches, counter logic is aggregated and shared making it easier to configure counts, manipulate (e.g., start/stop) the count update process, and retrieve and overwrite counts. Flexibility is enhanced through the programmability of the characteristics for each counter. The counter logic need only include one set of adders since all counts are updated sequentially. While a single count can be retrieved through one PIO-read request, a one-shot packetization mechanism provides the ability to retrieve a block of counts via a single read request thereby saving valuable bandwidth over conventional techniques.

Scalability and design reusability is also enhanced through the use of centralized counter logic. By changing the memory and lookup table sizes, the event counts can be scaled without going through architectural changes.

CONCLUSION

Implementations consistent with the principles of the invention efficiently perform accounting in a network device by providing centralized counter logic that performs all accounting functions and provides the ability to retrieve single counts through one PIO-read request or blocks of counts through a packetization technique thereby saving valuable bandwidth that would be spent on multiple PIO-read requests.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. For example, while series of acts have been described in FIGS. 7 and 9, the order of the acts may vary in other implementations consistent with the principles of the invention. Also, non-dependent acts may be performed in parallel.

Further, certain portions of the invention have been described as "logic" that performs one or more functions.

This logic may include hardware, such as an application specific integrated circuit, software, or a combination of hardware and software.

No element, act, or instruction used in the description of the present application should be construed as critical or essential to the invention unless explicitly described as such. Also, as used herein, the article "a" is intended to include one or more items. Where only one item is intended, the term "one" or similar language is used.

The scope of the invention is defined by the claims and their equivalents.

What is claimed is:

1. A method comprising:
   receiving, using a counter implemented at least partially in hardware, a request for a count for at least one processing unit, the count being stored in a memory, the counter including:
      a first table to store one or more pointers to blocks of count values in the memory, and
      a second table to store one or more offset values that identify a location of a count value, within one of the blocks of count values, or a width of the count value;
   retrieving, using the counter and based on at least one of the first table or the second table, the count from the memory; and
   updating, using the counter and based on the received request, the retrieved count.

2. The method of claim 1, where retrieving the count comprises:
   retrieving a single count value from the memory when the request is associated with a single line of counts; and
   retrieving at least one block of count values from the memory when the request is associated with a block retrieval.

3. The method of claim 2, further comprising:
   packetizing the at least one block of counter values after retrieving the at least one block of count values, and
   causing the packetized at least one block of counter values to be transmitted to a destination associated with the counter.

4. The method of claim 1, where updating the retrieved count comprises:
   incrementing the retrieved count to obtain an incremented count, and
   storing the incremented count in the memory.

5. The method of claim 1, further comprising:
   receiving, prior to retrieving the count, at least one update request,
   where the at least one received update request includes an increment amount; and
   updating the count based on the increment amount.

6. The method of claim 1, where the counter includes:
   a first adder configured to increment counter values, in the memory, by one, and
   a second adder configured to increment counter values, in the memory, by an increment amount received in the received request,
   the method further comprising:
      incrementing the retrieved count using the first adder; and
      incrementing a second count, retrieved from the memory, using the second adder.

7. The method of claim 1, where the second table stores a value, associated with a second count, indicating whether updating is enabled for the second count, and
   where the counter is to:
      receive an update request associated with the second count,
      determine, based on the value, that updating is enabled for the second count, and
      update the second count based on determining that updating is enabled for the second count.

8. A device, comprising:
   one or more processing units,
      at least one processing unit, of the one or more processing units, including a counter; and
   a memory, associated with the at least one processing unit, to store a plurality of count values for the at least one processing unit,
   the counter including:
      a first data structure to store a plurality of pointers to blocks of count values in the memory, and
      a second data structure to store offset values that identify a location of a count value within one of the blocks of count values, and
   the counter to:
      retrieve, using at least one of the table data structure or the second data structure, a count from the memory.

9. The device of claim 8, where the counter is further to:
   receive a count retrieval request,
   retrieve a single count value from the memory when the received count retrieval request is associated with a single line of counts, and
   retrieve at least one block of count values from the memory when the received count retrieval request is associated with a block retrieval.

10. The device of claim 8, where, when retrieving the count from the memory, the counter is to:
    receive a request associated with the count, and
    retrieve the count based on the received request.

11. The device of claim 10, where the received request includes at least one of:
    a source number that identifies a source of a data unit, or
    an event number that identifies an event associated with the data unit, and
    where the count is retrieved based on the at least one of the source number or the event number.

12. The device of claim 10, where the counter is further to:
    increment the retrieved count based on a first amount included in the received request associated with the count,
    receive a second request associated with a second count,
    retrieve, based on the received second request, the second count from the memory, and
    increment the retrieved second count based on a second amount, different than the first amount, included in the received second request.

13. The device of claim 8, where the received request includes an increment amount that identifies an amount based on which the count is to be incremented, and
    where the counter is further to:
       increment the retrieved count based on the increment amount to obtain an incremented count, and
       store the incremented count in the memory.

14. The device of claim 8, where the second data structure stores a value, associated with a second count, indicating whether updating is enable for the second count, and
    where the counter is to:
       receive an update request associated with the second count,
       determine, based on the value, that updating is enabled for the second count, and update the second count based on determining that updating is enabled for the second count.

15. The device of claim 8, where the memory includes at least one of a saturation region or a roll-over region, where a first count, in the saturation region, is reset when the first count is retrieved by the counter, and where a second count, in the roll-over region, is not reset when the second count is retrieved by the counter.

16. A system comprising:

a device comprising:

one or more processing blocks;

a memory to store counter values for at least two of the one or more processing blocks; and a counter comprising data structures to provide a location of the stored counter values in the memory, the data structures including:

a first data structure to store one or more pointers to blocks of counter values, of the counter values stored in the memory, and a second data structure to store offset values that identify a location of a counter value within one of the blocks of counter values, and a width of the counter value, the counter being to retrieve, using at least one of the first data structure or the second data structure, a first counter value of the stored counter values, based on a request for the first counter value.

17. The system of claim 16, where, when retrieving the first counter value using at least one of the first data structure or the second data structure, the counter is to:

use the first data structure to obtain a pointer, of one or more pointers, to a first block of counter values, of the blocks of counter values, associated with the first counter value, and use the second data structure to obtain a location of the first counter value in the first block.

18. The system of claim 16, where the data structures further include:

a third data structure to store one or more pointers to second blocks of counter values of the counter values stored in the memory, where the first data structure is associated with a roll-over region of the memory, the first blocks of counter values being included in the roll-over region, and where the third data structure is associated with a saturated region of the memory, the second blocks of counter values being included in the saturated region.

19. The system of claim 16, where the counter is further to:

increment the first counter value, based on an increment amount included in the request for the first counter value, to obtain an incremented first counter value, and store the incremented first counter value in the memory.

20. The system of claim 16, where the request includes at least one of a source number that identifies a source of a packet or an event number that identifies an event associated with the packet, and where the first counter value is retrieved based on the at least one of the source number or the event number.

* * * * *

UNITED STATES PATENT AND TRADEMARK OFFICE
CERTIFICATE OF CORRECTION

| | | |
|---|---|---|
| PATENT NO. | : 8,331,359 B2 | Page 1 of 1 |
| APPLICATION NO. | : 12/723280 | |
| DATED | : December 11, 2012 | |
| INVENTOR(S) | : Albert Weichung Kuo et al. | |

It is certified that error appears in the above-identified patent and that said Letters Patent is hereby corrected as shown below:

Claim 8, line 15 (Column 10, line 22), delete "table" and insert -- first --.

Signed and Sealed this

Twenty-ninth Day of January, 2013

David J. Kappos
*Director of the United States Patent and Trademark Office*